United States Patent Office 3,794,674
Patented Feb. 26, 1974

3,794,674
PRODUCTION OF ISONITRILES
Peter Hoffmann, Cologne, and Dieter Marquarding, Leverkusen, Germany, Var Ugi, Los Angeles, Calif., and Dieter Arlt and Hermann Hagemann, Cologne, Germany, assignors to Bayer Aktiengesellschaft, Leverkusen, Germany
No Drawing. Filed Dec. 1, 1970, Ser. No. 94,178
Claims priority, application Germany, Dec. 16, 1969, P 19 62 898.9
Int. Cl. C07c *121/12*
U.S. Cl. 260—465 B
9 Claims

ABSTRACT OF THE DISCLOSURE

In the production of an isonitrile by the reaction of a formamide with phosgene in the presence of an aqueous base, the improvement which comprises effecting said reaction in the presence of a catalytic amount of a tertiary amine.

The present invention relates to and has for its objects the provision of particular new methods of reacting formamides, i.e. N-formylamines, with phosgene, to form the corresponding isonitriles, which are known to have acaricidal, insecticidal and fungicidal activity, in a simple reaction, using readily available starting materials and resulting in outstanding yields and purity, with other and further objects of the invention becoming apparent from a study of the within specification and accompanying examples.

It is known that isonitriles are obtained when N-formylamines, i.e. formamides, are reacted with phosgene in the presence of aqueous bases (see Belgian patent specification 728,851). This process, however, has the great disadvantage that the yields are not always satisfactory, and in many cases the formamides cannot be reacted at all, for example the following compounds:

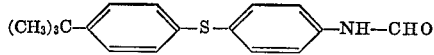

(1)

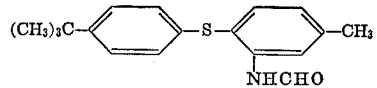

(2)

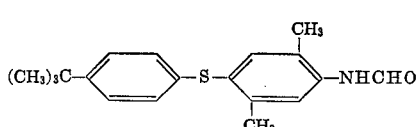

(3),

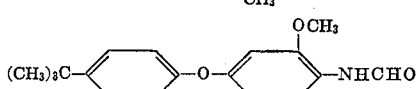

(4),

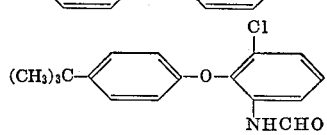

(5), and

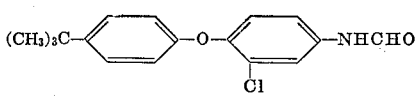

(6).

It has now been found, in accordance with the present invention, that a versatile and smooth process may be provided for the production in favorably high yields and high purity of an isonitrile by the reaction of a formamide, i.e. an N-formylamine, with phosgene in the presence of an aqueous base and in the presence of a catalytic amount of a tertiary amine.

It is decidedly surprising that the addition of a small amount of a tertiary amine leads to a substantial improvement in the yield of the isonitrile.

The process according to the invention exhibits a number of advantages. Thus, a number of isonitriles, as already mentioned, cannot be prepared according to the comparable known processes. In comparison with processes of the prior art, in which, instead of aqueous bases, organic bases are used, substantially lower amounts of tertiary amine are required [see I. Ugi. W. Betz, U. Fetzer and K. Offerman, Chemische Berichte, vol. 94, pp. 2814 to 2816 (1961).

In accordance with a preferred aspect of the invention, the N-formylamine has the general formula:

(7)

and the resulting isonitrile has the general formula

(8)

in which

R stands for an aliphatic, cycloaliphatic or aromatic radical which may carry as a substituent at least one of halogen, alkoxy, aryloxy, alkylmercapto, arylmercapto, alkyl, cycloalkyl, aryl, cyano, carboxylic ester, carbonamide, nitro, alkylsulfone and arylsulfone groups.

Preferably the aliphatic, cycloaliphatic and aromatic radicals are saturated, i.e. alkyl, cycloalkyl and aryl, and preferably the alkyl portions of any substituents thereon are lower alkyl.

If 2,6-xylyl-N-formylamine is used as a starting material, for example, the reaction can be represented by the following equation:

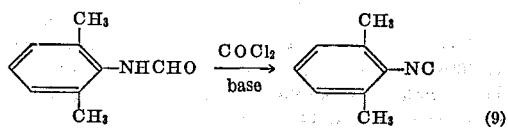

(9)

As examples of the N-formylamines of the Formula 7 which can be used according to the invention, there are mentioned methyl-, ethyl-, n-propyl-, iso-propyl-, n- and tert.-butyl-, n-hexyl-, cyclohexyl-, tert.-octyl-, stearyl-, pentamethylene-, di-, β-n-butoxyethyl-, 6-chloro-n-hexyl-, 5-ethoxycarbonylpentyl-, 3-sulfolanyl-, benzyl-, 3,4-dichlorobenzyl-, α-naphthyl-, methyl-, phenyl-, p-tolyl-, 2,6-xylyl-, m-nitrophenyl-, β-naphthylmercaptoethyl-, β-naphthylmercapto-4-phenyl-, 4-(p-tert.-butylphenylmercapto)-phenyl-, 2-(p-tert.-butyl-phenyl-mercapto)-5-methylphenyl-, 2-(p-tert.-butylphenoxy)-3-chlorophenyl-, 4-(p-tert.-butylphenoxy)-2-methoxyphenyl-, 4 - (p-tert.-butylphenoxy)-3-chlorophenyl-, 2-(p-tert.-butyl-phenoxy)-4-chlorophenyl-, 2-(p-tert.-butylphenylmercapto)-5-chlorophenyl-, 4-(p-tert.-butylphenylmercapto) - 2 - chlorophenyl-2-(p-tert.-butylphenylmercapto)-4-methylphenyl-, 4 - (2,6-dimethylphenylmercapto)-phenyl-, 2 - (p-isopropylphenylmercapto) - 5 - methylphenyl-, 4-(p-tert.-butylphenylsulfonyl)-phenyl-, 2-(p-tert.-butylphenylsulfonyl)-5-methylphenyl-, 3 - (phenylsulfonyl)-6-chlorophenyl-, 3-(phenylsulfonyl)-phenyl-, 4-(p-tert.-butylphenylmercaptomethyl)-N-formylamine, and the like.

Suitable aqueous bases include solutions of hydroxides, carbonates and bicarbonates of the alkali metals and of the alkaline earth metals. Frequently, the yield can be increased when neutral salts such as sodium chloride are added to the aqueous solution of base. Here, it is necessary for the pH value of the aqueous solution to be in the range of about 6 to 12, preferably between about 6 to 8 and about 11 to 12.

Preferably the reaction is carried out in the presence of an organic solvent. Suitable solvents include aromatic and aliphatic hydrocarbons (which may be chlorinated), ethers, carboxylic acid esters and ketones, e.g. benzene, toluene, xylene, chlorobenzene, alkanes liquid under reaction conditions and having up to about 18 carbon atoms such as gasoline, halogenated lower alkanes such as ethylene chloride, lower alkyl ethers, lower alkyl esters of lower fatty acids such as ethyl acetate, lower alkyl ketones such as methyl-isobutyl ketone, and the like. Furthermore, water-soluble solvents such as acetone or glycoldimethyl ether are also suitable if the aqueous phase of the reaction mixture comprises a saturated solution of neutral salt, such as sodium chloride.

The reaction temperature can be varied within a fairly wide range. In general, the work is carried out at from about −20° to +70° C., preferably from about 0° to 35°C., and the reaction mixture should be stirred intensively.

As the catalytically-acting tertiary amine, a trialkylamine or dialkylarylamine with a total of 6 to 20 carbon atoms is normally used, preferably in an amount of about 0.1 to 20 mole percent, especially about 1 to 10 mole percent, with reference to the N-formylamine used.

The following tertiary amines are mentioned, by way of example:

triethylamine, tributylamine, benzyldimethylamine, n-dodecyldimethylamine, cyclohexyldimethylamine, hexamethylene-bis-dimethylamine, dimethylaniline, p-dimethylaminotoluene, 4,4'-dimethylamino-diphenylmethane, p-chlorodimethylaniline, and the like.

When carrying out the process according to the invention, about 1 to 4 moles, preferably about 1.2 to 1.5 moles, of phosgene are generally used per mole of N-formylamine.

The isonitriles which can be prepared according to the process are, as is known, valuable acaricides, fungicides and insecticides (see Belgian patent specification 730,945).

The active compounds according to the instant invention can be utilized, if desired, in the form of the usual formulations or compositions with conventional inert (i.e., plant compatible or herbicidally inert) pesticide diluents or extenders, i.e. diluents or extenders of the type usable in conventional pesticide formulations or compositions, e.g. conventional pesticide dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and or dispersible solid carriers optionally with the use of carrier vehicle assistants, e.g. conventional pesticide surface-active agents, including emulsifying agents and or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g., benzene, toluene, xylene, etc.), halogenated, especially chlorinated, aromatic hydrocarbons (e.g., chloro-benzenes, etc.), paraffins (e.g., petroleum fractions), chlorinated aliphatic hydrocarbons (e.g., methylene chloride, etc.), alcohols (e.g., methanol, ethanol, propanol, butanol, etc.), amines (e.g., ethanolamine, etc.), ethers, ether-alcohols (e.g., glycol monomethyl ether, etc.), amides (e.g., dimethyl formamide, etc.), sulfoxides (e.g., dimethyl sulfoxide, etc.), ketones (e.g., acetone, etc.) and/or water; as well as inert dispersible finely divided solid carriers, such as ground natural minerals (e.g., kaolins, alumina, silica, chalk, i.e. calcium carbonate, talc, kieselguhr, etc.) and ground synthetic minerals (e.g., highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.) and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, or insecticides, rodenticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.005–3%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.005–95%, by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare ars needed, and often amounts only up to about 1 quart/acre, preferably 2–16 fluid ounces/acre, are sufficient. In this process it is possible to use highly concentrated liquid compositions with said liquid carrier vehicles containing from 20 to about 95% by weight of active compound or even the 100% active substance alone, e.g. about 20–100% by weight of the active compound.

Furthermore, the present invention contemplates methods of selectively killing, combating or controlling pests, i.e. acarids, fungi and insects, at all stages of their development, including the egg stage, and more particularly, methods of combating pests which comprise applying to at least one of correspondingly (a) such pests, and (b) the corresponding habitat, i.e. the locus to be protected, a correspondingly combative or toxic amount, i.e. a pesticidally effective amount, of the particular active compound of the invention alone or together with a carrier vehicle as noted above. The instant formulations or compositions are applied in the usual manner, for instance by spraying, atomizing, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated, without limitation, by the following examples:

EXAMPLE 1

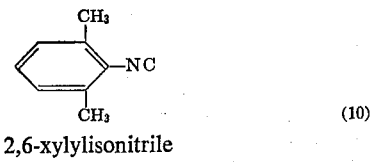

2,6-xylylisonitrile (a) Without amine addition.—14.9 g. of 2,6-xylyl formamide are dissolved in 80 ml. ethylene chloride, and 30 ml. of a saturated aqueous solution of sodium chloride are added. 16 g. of phosgene are introduced at 0° to 5° C., with vigorous stirring. The pH value of the reaction mixture is kept at 8 to 10 by continuous addition of a 45%-strength aqueous solution of sodium hydroxide. After completeion of the addition of phosgene, the pH value is brought to 11, the ethylene chloride phase is separated and complete concentration is effected under reduced pressure. No 2,6-xylylisonitrile can be detected in the residue by means of infrared analysis.

(b) With amine addition.—2 kg. of phcosgene are introduced in 1 hour at 30° C., with vigorous stirring, into a mixture of 1.85 kg. of 2,6-xylyl formamide, 7 liters of ethylene chloride and 3 liters of a saturated aqueous solution of sodium chloride. The pH value of the reaction mixture is kept at 9.5 to 10 by continuous addition of 45-strength aqueous NaOH.

Simultaneously, about 100 g. of dimethylaniline in about 100 ml. of ethylene chloride are added incrementally. After completion of the addition of phosgene, the pH value is adjusted to 11, the ethylene chloride phase is separated, and complete concentration is effected under reduced pressure.

Yield: 1.4 kg. (88% of the theory) 2,6-xylylisonitrile; M.P. 68° to 70° C.

EXAMPLE 2

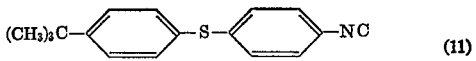

4-(p-tert.-butylphenylmercapto)-phenylisonitrile (a) Without amine addition.—102.8 g. of 4-(p-tert.-butylphenylmercapto)-phenylformamide are dissolved in 200 ml. of ethylene chloride. After addition of 210 ml. of water and 5 g. of sodium bicarbonate, 80 g. of phosgene are introduced in 20 minutes at 0° to 5° C., with vigorous stirring. The pH value of the suspension is kept between 5.7 and 8.2 by continuous addition of a 45%-strength aqueous solution of sodium hydroxide. After completion of the addition of phosgene, the pH value is brought to 10, 20 ml. of concentrated ammonia solution are added, and the mixture is stirred for a further 10 minutes. The organic phase is subsequently separated at 15° C. and concentrated under reduced pressure. No 4-(p-tert. - butylphenylmercapto) - phenylisonitrile can be isolated.

(b) With amine addition.—550 g. (4-p-tert.-butylphenylmercapto)-phenylformamide are dissolved in 1 liter of ethylene chloride. After addition of 600 ml. water, 25 g. of sodium bicarbonate and 25 g. of N,N-dimethylaniline, 400 g. of phosgene are introduced in 1¼ hours at 0° to 5° C., with vigorous stirring. The pH value of the suspension is kept at 6 to 8 by continuous addition of a 45% strength aqueous solution of NaOH. After completion of the addition of phosgene, the pH value is adjusted to 10, 50 ml. concentrated ammonia solution are added, and the mixture is afterwards stirred for 10 minutes. The organic phase is subsequently separated and completely concentrated whereupon the residue crystallizes.

Yield: 485 g. (95% of the theory) of 4-(p-tert.-butylphenylmercapto)-phenylisonitrile; M.P. 56 to 57° C.

EXAMPLE 3

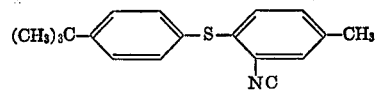

2-(p-tert.-butylphenylmercapto)-5-methylphenylisonitrile (a) Without amine addition.—299 g. of 2-(p-tert.-butylphenylmercapto)-5-methylphenyl formamide are dissolved in 800 ml. of ethylene chloride. After addition of 900 ml. of water, 300 g. of phosgene are introduced in 1¼ hours at 0 to 5° C., with vigorous stirring. The pH value of the suspension is kept at 11 to 12 by continuous addition of a concentrated solution of sodium hydroxide. After completion of the addition of phosgene, 30 ml. of concentrated ammonia solution are added and the mixture is afterwards stirred for 10 minutes. The organic phase is subsequently separated and concentrated under reduced pressure.

From the residue, no 2-(p-tert.-butylphenylmercapto)-5-methylphenylisonitrole can be isolated.

(b) With amine addition.—299 g. of 2-(p-tert.-butylphenylmercapto)-5-methylphenylformamide are dissolved in 800 ml. of ethylene chloride. After addition of 900 ml. of water and 10 g. of tributylamine, 300 g. of phosgene are introduced in 1¼ hours at 0° to 5° C., with vigorous stirring. The pH value of the suspension is kept at 11 to 12 by continuous addition of a concentrated solution of sodium hydroxide.

After completion of addition of phosgene, 30 ml. of concentrated ammonia solution are added and the mixture is then stirred for 10 minutes.

The organic phase is subsequently separated and completely concentrated under reduced pressure.

Yield: 255 g. (91% of the theory) 2-(p-tert.-butylphenylmercapto)-4-methylphenylisonitrile.

A sample, after recrystallization from methanol, melts at 89 to 296° C.

EXAMPLE 4

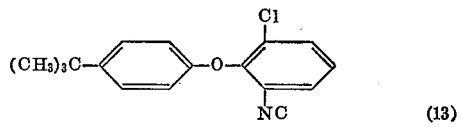

2-(p-tert.-butylphenoxy)-3-chlorophenylisonitrile 30.4 g. of 2 - (p-tert.-butylphenoxy)-3-chlorophenyl formamide are dissolved in 180 ml. of ethylene chloride. After addition of 90 ml. of water and 1 g. of tributylamine, 30 g. of phosgene are introduced in half an hour at 0° to 5° C., with vigorous stirring. By continuous addition of a concentrated solution of sodium hydroxide, the pH value is kept at 11 to 12.

After completion of the addition of phosgene, 3 ml. of concentrated ammonia solution are added and the mixture is then stirred for 10 minutes. The organic phase is separated and completely concentrated under reduced pressure.

Yield: 28 g. (98% of the theory) of 2-(p-tert.-butylphenoxy-3-chlorophenylisonitrile.

The initially oily product crystallizes completely upon addition of methanol and then has a melting point of 64.5° to 66° C.

It will be appreciated that the instant specification and examples are set forth by way of illustration and not limitation, and that various modifications and changes may be made without departing from the spirit and scope of the present invention.

What is claimed is:

1. In the production of an isonitrile of the formula R—NC by the reaction of a formamide of the formula R—NHCHO with phosgene in the presence of an aqueous solution of the hydroxide, carbonate or bicarbonate an alkali metal or an alkaline earth metal, the improvement which comprises effecting said reaction in the presence of about 0.1 to 20 mole percent of a tertiary amine based on the formamide, said tertiary amine being selected from the group consisting of hexamethylene-bis-dimethylamine, 4,4'-dimethylamino-diphenylmethane and

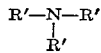

wherein
R is phenyl carrying at least one substituent selected from the group consisting of halogen, alkoxy, aryloxy, alkylmercapto, arylmercapto, alkyl, cycloalkyl, aryl, cyano, carboxylic ester, carbonamide, nitro, alkylsufone and arylsulfone radicals, and
each R' is independently alkyl of 1 to 12 carbon atoms, cyclohexyl, phenyl, methylphenyl or chlorophenyl.

2. A process according to claim 1, in which the formamide is a member selected from the group consisting of 2,6-xylyl formamide, 4 - (p - tert.-butylphenylmercapto)-phenylformamide and 2-(p-tert.-butylphenylmercapto)-5-methyl-phenyl formamide.

3. A process according to claim 1, in which said reaction is effected in an inert organic solvent at a temperature of about −20 to 70° C. and at a pH of about 6 to 12.

4. A process according to claim 1 in which the molar ratio of phosgene to formamide is about 1-4:1.

5. A process according to claim 1, in which the aqueous solution contains sodium chloride.

6. A process according to claim 5, in which the reaction is begun using a saturated solution of sodium chloride and the hydroxide, carbonate or bicarbonate is added thereto during the course of the reaction to maintain the pH in the range of about 6 to 12.

7. A process according to claim 3, in which the organic solvent is acetone or glycoldimethyl ether.

8. A process according to claim 1, in which the temperature is about 0 to 35° C., and the pH is about 8 to 11, the molar ratio of phosgene to formamide is about 1.2–1.5:1.

9. A process according to claim 8, in which the reaction is begun using a saturated solution of sodium chloride and the hydroxide, carbonate or bicarbonate is added thereto during the course of the reaction to maintain the pH.

References Cited
UNITED STATES PATENTS

| | | | |
|---|---|---|---|
| 3,405,160 | 10/1968 | Eholzer et al. | 260—464 X |
| 3,419,546 | 12/1968 | Fetzer et al. | 260—464 X |
| 3,419,596 | 12/1968 | Fetzer et al. | 260—464 X |
| 3,636,036 | 1/1972 | Ugi | 260—464 |
| 3,661,965 | 5/1972 | Arlt et al. | 260—465.2 X |

JOSEPH P. BRUST, Primary Examiner

U.S. Cl. X.R.
260—464, 465.2